(12) United States Patent
Hellouin et al.

(10) Patent No.: US 10,987,849 B2
(45) Date of Patent: Apr. 27, 2021

(54) MOLDING UNIT WITH OFF-CENTER NECK PASSAGE OPENING

(71) Applicant: SIDEL PARTICIPATIONS, Octeville-sur-Mer (FR)

(72) Inventors: Damien Hellouin, Octeville-sur-Mer (FR); Alexandre Toutoux, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/385,199

(22) Filed: Apr. 16, 2019

(65) Prior Publication Data

US 2019/0315041 A1   Oct. 17, 2019

(30) Foreign Application Priority Data

Apr. 16, 2018   (FR) ...................................... 1853297

(51) Int. Cl.
| | |
|---|---|
| *B29C 49/36* | (2006.01) |
| *B29C 49/48* | (2006.01) |
| *B29K 623/00* | (2006.01) |
| *B29K 667/00* | (2006.01) |
| *B29L 31/00* | (2006.01) |

(52) U.S. Cl.
CPC .............. *B29C 49/48* (2013.01); *B29C 49/36* (2013.01); *B29C 2049/4879* (2013.01); *B29K 2623/12* (2013.01); *B29K 2667/003* (2013.01); *B29L 2031/7158* (2013.01)

(58) Field of Classification Search
CPC .. B29C 49/48; B29C 2049/4879; B29C 49/36
See application file for complete search history.

(56) References Cited

U.S. PATENT DOCUMENTS

| | | | | | |
|---|---|---|---|---|---|
| 3,408,692 | A | * | 11/1968 | Schaich .............. | B29C 49/4242 425/532 |
| 3,781,395 | A | * | 12/1973 | Uhlig ...................... | B29C 49/08 264/530 |
| 3,944,642 | A | * | 3/1976 | Uhlig .................... | B29C 49/022 264/530 |
| 4,195,053 | A | * | 3/1980 | Lambarth ............... | B29C 49/32 264/533 |

(Continued)

FOREIGN PATENT DOCUMENTS

| | | |
|---|---|---|
| FR | 3 066 136 A1 | 11/2018 |
| JP | S57 59725 A | 4/1982 |

OTHER PUBLICATIONS

French Search Report, dated Jan. 25, 2019, from corresponding French application No. 1853297.

*Primary Examiner* — Robert B Davis (57) ABSTRACT

Disclosed is molding unit for the forming of containers made of thermoplastic material including: two half-molds delimited by a front joint face and by a rear assembly face, with the two half-molds being able to occupy a joined position via their joint face; and a molding cavity that is made of two parts in each joint face, where the cavity opens vertically upward via a passage opening. In the joined position, the assembly faces of the mold have two planes of symmetry that intersect at a central vertical axis of the mold. The central axis of the passage opening is offset transversely in relation to the central axis of the mold.

18 Claims, 5 Drawing Sheets

(56) References Cited

U.S. PATENT DOCUMENTS

| | | | | |
|---|---|---|---|---|
| 5,178,817 | A * | 1/1993 | Yamada | B29C 49/0073 |
| | | | | 264/295 |
| 7,033,535 | B1 * | 4/2006 | Limanjaya | B29C 49/0073 |
| | | | | 264/531 |
| 7,150,371 | B1 * | 12/2006 | Larson | B65D 1/0276 |
| | | | | 215/373 |
| 2007/0023385 | A1 * | 2/2007 | Janeczek | B65D 23/10 |
| | | | | 215/398 |
| 2007/0145646 | A1 | 6/2007 | Cho | |
| 2009/0028976 | A1 | 1/2009 | Dannebey | |
| 2009/0139996 | A1 * | 6/2009 | Jacson | B29C 49/4802 |
| | | | | 220/771 |
| 2009/0263535 | A1 * | 10/2009 | Tonga | B29C 33/30 |
| | | | | 425/522 |
| 2013/0337099 | A1 * | 12/2013 | Cirette | B29C 33/202 |
| | | | | 425/161 |

* cited by examiner

PRIOR ART

MOLDING UNIT WITH OFF-CENTER NECK PASSAGE OPENING

TECHNICAL FIELD OF THE INVENTION

The invention relates to a molding unit for the forming of containers made of thermoplastic material starting from preforms, in particular by blow molding or stretch blow molding, with the molding unit comprising:

Two mold supports that are hinged around a vertical axis between an open position and a closed position;

A mold comprising at least two half-molds, each designed to be mounted on one of the associated mold supports, each half-mold being delimited by a front joint face and by a rear assembly face, with the two half-molds being able to occupy a joined position via their joint face when the mold supports occupy their closed position;

A molding cavity that is made of two parts in each joint face and that is recreated when the mold occupies its joined position, where the cavity opens vertically upward via a passage opening that is designed to allow a neck of the preform to pass.

TECHNICAL BACKGROUND OF THE INVENTION

It is known to mass-produce containers, in particular bottles, made of thermoplastic materials by blow molding or stretch blow molding of preforms. For this purpose, the hot preforms are inserted into molding units having a molding cavity in the shape of the container that is to be obtained.

To make it possible to mass-produce containers, multiple molding units are arranged on a main wheel forming a rotary carousel of a forming system. This makes it possible to form multiple containers successively during their movement between an entry point and an exit point.

In the manufacturing phase, the preforms are brought to a molding unit of the forming system with which is associated a forming device by application of at least one gaseous and/or liquid pressurized forming fluid in the preform. The forming of the preform is achieved by, for example, blow molding or stretch blow molding by means of a pressurized gas, such as air.

In a forming system with a rotary carousel, each molding unit comprises at least one mold that is equipped with a molding cavity. The mold is made of at least two half-molds, each bearing an impression of half of the molding cavity. The half-molds are carried by two associated mold supports. The mold supports are movable between an open position, in which the two half-molds are separated to make it possible to extract a molded container and to insert a preform, and a closed position, in which the two half-molds occupy a joined position in order to recreate the molding cavity during the forming operation.

The two mold supports are mounted to pivot in relation to one another, articulated by a vertical hinge. Such a molding unit is also known under the name "portfolio mold."

As a variant, the mold supports are mounted to slide in relation to one another.

The containers that are obtained by such a method are in particular bottles. Such a bottle comprises a body delimiting a volume that is designed to receive a product, for example a liquid or a powder. The body generally comprises a flat bottom that makes it possible to place the bottle upright. The bottle is generally open toward the top via a neck that can be stoppered. The neck makes it possible for the user to pour the product that is contained in the bottle. Hereinafter, the main axis of the container is defined as being the vertical axis that passes through the center of the neck.

In numerous fields, it is known to produce a bottle with the neck centered in relation to the horizontal cross-section of the body of the bottle. Below, such a container will be called "container with centered neck." This is in particular the case of water bottles. In this case, the main axis of the container passes through the center of the horizontal cross-sections of the container.

The container manufacturers are often led to change the model of containers that are produced. This is in particular the case of manufacturers who produce containers or bottles that are designed to contain household or hygiene products, so-called "home personal care" products. To make possible this change in model, it is known to design molding units making it possible to replace the mold elements comprising the cavity easily and quickly.

Figures 1, 2, 3:
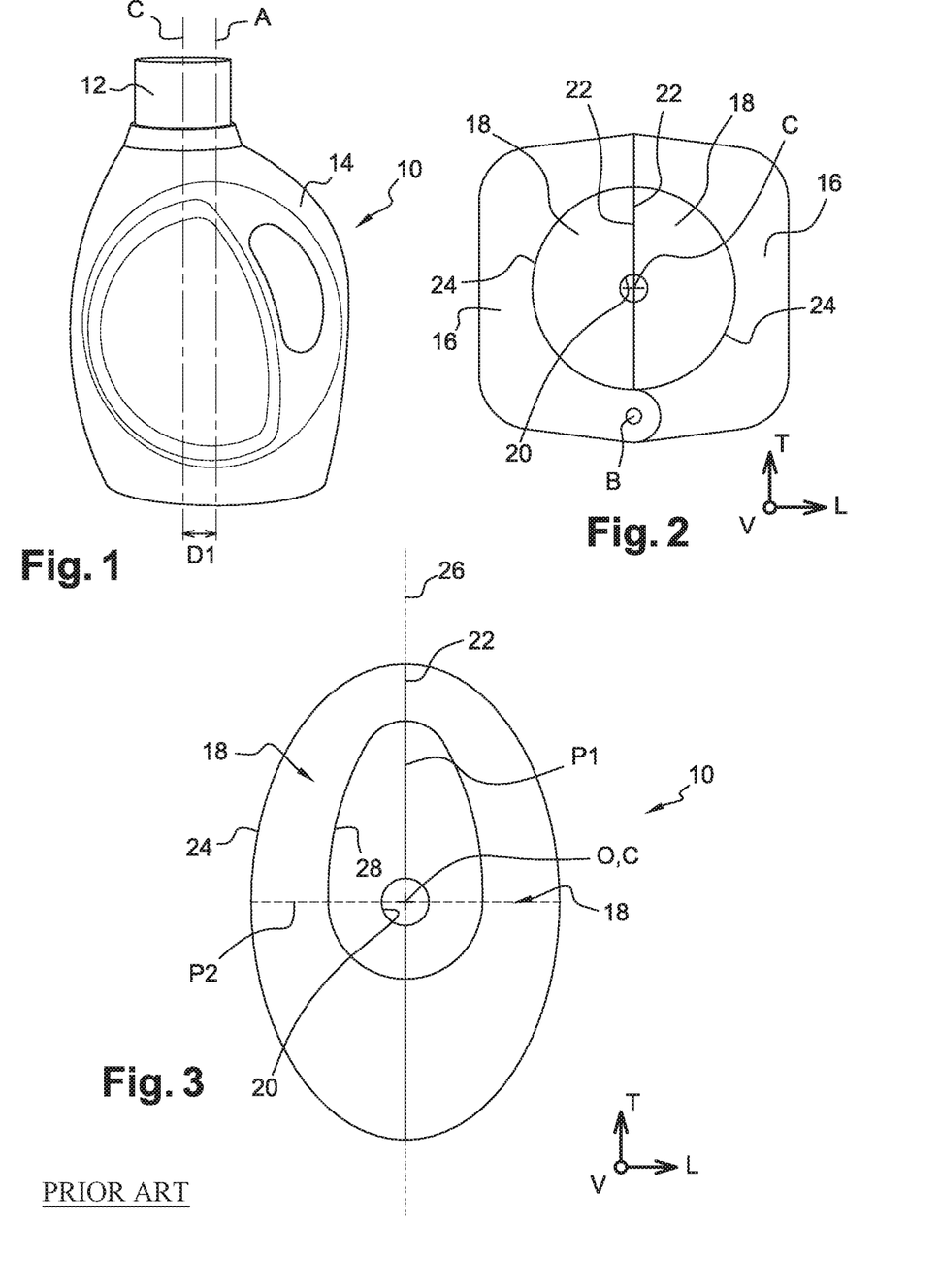
FIG. 1 is a side view that shows a container with an oblong cross-section and an eccentric neck.
FIG. 2 is a top view that shows a molding unit that is produced according to a first known state of the art.
FIG. 3 is a top view that shows a mold that is produced according to a second known state of the art.

As is shown in FIG. 1, it is common for containers 10 of the field of "home personal care" to have a horizontal cross-section of oblong shape.

In addition, certain large containers have a very large capacity, for example on the order of multiple liters. This is, for example, the case of certain bottles that are designed to contain detergent.

Furthermore, in this type of container of the "home personal care" field, it is very common for a neck 12 of the container to be eccentric in relation to the center of the horizontal cross-section of the container 10. Below, such a container will be called "container with eccentric neck." Shown in FIG. 1 is the main axis "C" of the container that passes through the center of the neck 12. An axis "A" that passes overall through the center of each horizontal cross-section of the container was also shown. As FIG. 1 shows, the off-centering of the neck 12 is reflected by a transverse offset "D1" of the main axis "C" of the container in relation to the axis "A," in the direction of the length of the oblong cross-section of the container.

This makes it possible in particular to reserve a place in the wall of the container in order to produce a handle 14 on the side that is opposite to that of the neck 12. In addition, the off-centering of the neck 12 in relation to the handle 14 makes it possible to facilitate the use of the container for the final user by moving the center of gravity of the container toward the neck 12 when the container is inclined in order to make it possible to pour its contents.

The molding units are therefore provided to make possible the production of large oblong containers.

In a traditional manner, the molding units are produced on the model of the molding units that are used for producing containers with centered necks, as is shown in, for example, FIG. 2. In general, the molding unit comprises two mold supports 16 that are mounted articulated in relation to one another along an axis "B" with a vertical hinge. A half-mold 18 is accommodated in each support 16. The half-molds 18 each comprise a half-cavity that is recreated when the two half-molds 18 are joined, in the closed position of the mold supports 16. The cavity opens toward the top via a passage opening 20 that is designed to allow the neck 12 of the container to pass.

Since the two half-molds 18 are identical by symmetry in relation to a joint plane, the half-mold 18 will only be described from the left, with the description being applicable to the half-mold 18 on the right by symmetry.

Thus, the half-mold 18 is delimited longitudinally toward the front by a vertical transverse plane front joint face 22, which is equipped with one half of a molding cavity (not shown). In a joined position, the two half-molds 18 are designed to be joined by flattening their respective joint faces 22 longitudinally against one another in order to recreate the molding cavity, as shown in FIG. 2.

The half-mold 18 is also delimited longitudinally toward the rear by an opposite vertical assembly face 24. The assembly face 24 has, in horizontal cross-section, a shape that is curved in a convex manner. The assembly face 24 is designed to be housed in an additional receiving face of an associated mold support 16. The assembly face 24 generally has a semi-cylindrical shape. Thus, when the two half-molds 18 occupy their joined position, their assembly faces 24 have, in horizontal cross-section, a circular shape.

The passage opening 20 is always arranged astride the joint plane between the two half-molds 18. It is common practice that the passage opening 20 of the neck is centered in relation to the circular cross-section of the assembly faces 24 of the half-molds.

However, such an embodiment, in which the mold has a cylindrical assembly face for revolution, can become very cumbersome when it involves producing containers of the "home personal care" field having an oblong cross-section, a large volume, and an eccentric neck.

So that the carousel can carry a high enough number of molding units, for example 10, while remaining fairly compact, it is known to produce molding units comprising so-called "elliptical" molds. These elliptical molds have, in horizontal cross-section, an oblong contour.

Such an elliptical mold that is produced according to the state of the art was shown in FIG. 3.

The mold has two single-piece half-molds 18 that are each carried by an associated mold support (not shown). Since the two half-molds 18 are identical by symmetry in relation to a joint plane 26, the half-mold 18 will only be described from the left, with the description being applicable to the half-mold 18 on the right by symmetry.

Thus, the half-mold 18 is delimited longitudinally toward the front by a vertical transverse plane front joint face 22, which is equipped with one half of the molding cavity 28. The joint face 22 extends into the joint plane 26. In a joined position, the two half-molds 18 are designed to be joined by flattening their respective joint faces 22 longitudinally against one another in order to recreate the molding cavity 28.

The half-mold 18 is also delimited longitudinally toward the rear by an opposite vertical assembly face 24. The assembly face 24 has, in horizontal cross-section, a shape that is curved in a convex manner. The assembly face 24 is designed to be housed in an additional receiving face of an associated mold support (not shown). The assembly face 24 generally has a cylindrical shape that is formed by the translation of a straight vertical generatrix line on the main curve, which is formed by the curved shape of the assembly face 24 in horizontal cross-section shown in FIG. 3.

In a known manner, the assembly face 24 has, in horizontal cross-section, the shape of a half-oval. In the joined position, the assembly faces 24 of the two half-molds 18 therefore form a complete oval.

The assembly face 24 of the mold in the joined position has a first plane "P1" that extends into the joint plane 26. In the example shown in the figures, the first plane "P1" forms a plane of symmetry for the assembly faces 24.

Likewise, the assembly face 24 of the mold in the joined position also has a second vertical plane "P2" of symmetry that extends orthogonally to the first plane "P1" of symmetry. The two planes "P1" and "P2" of symmetry intersect in a central vertical axis "O". As can be seen, the axis "C" of the passage opening 20 is aligned here with the central axis "O" of the mold 18.

This is always the case, even when the main axis "C" of the container that is to be obtained is offset in relation to the cross-section of the container, as is illustrated in, for example, FIG. 3. In this case, the cavity 28 extends more from one side of the mold 18 than from the other, here transversely toward the top of FIG. 3.

Such a mold that is produced according to the state of the art advantageously makes it possible to produce large oblong containers by reducing the longitudinal space requirement of the molds in relation to molds that have, in cross-section, a circular contour, as illustrated in FIG. 2.

However, with the passage opening 20 being centered in relation to the mold 18 but eccentric in relation to the cross-section of the container that is to be obtained, a portion of the volume of the mold 18, as shown at the bottom of FIG. 3, remains unused for the production of the container.

In addition, it is not possible to modify the position of the passage opening 20 of the neck because the latter's position is determined by the position of the forming device that is associated with the molding unit. However, such a forming device is cumbersome and is generally mounted in a stationary position on the main wheel of the molding system.

BRIEF SUMMARY OF THE INVENTION

The invention proposes a molding unit for the forming of containers made of thermoplastic material starting from preforms, in particular by blow molding or stretch blow molding, with the molding unit comprising:
Two mold supports that can move between an open position and a closed position;
A mold comprising at least two half-molds, each designed to be mounted on one of the associated mold supports, each half-mold being delimited by a front joint face and by a rear assembly face, with the two half-molds being able to occupy a joined position via their joint face when the mold supports occupy their closed position;
A molding cavity that is made of two parts in each joint face and that is recreated when the mold occupies its joined position, with the cavity opening vertically upward via a passage opening that is designed to allow a neck of the preform to pass; In the joined position, the assembly faces of the mold have:
A first transverse vertical plane that extends along joint faces and that passes through the center of the passage opening, and
A second vertical plane of symmetry that is orthogonal to the first plane of symmetry, with the two planes of symmetry intersecting at a central vertical axis of the mold; characterized in that the central axis of the passage opening is offset transversely in relation to the central axis of the mold.

According to other characteristics of the molding unit that is produced according to the teachings of the invention:
The first plane passes through a hinge axis between the two mold supports, with the passage opening being offset in a direction that is opposite to that of the hinge axis in such a way that the central axis of the mold is interposed between the central axis of the passage opening and the hinge axis;
In the joined position of the mold, the assembly faces have an elliptical horizontal cross-section;

In the joined position of the mold, the assembly face of each half-mold has a horizontal cross-section in the shape of an arc that extends over a sector of less than 180°;

Each half-mold is made of a single piece;

Each half-mold is made of two parts:

An internal shell that is delimited longitudinally by a front face forming the joint face of the half-mold and by a rear face, opposite to the joint face, and forming a mounting face of convex shape;

An external shell-carrier that is delimited longitudinally by a front receiving face of a shape that is complementary to that of the mounting face of the shell and in which the mounting face of the shell is housed and by an opposite rear face that forms the assembly face of the half-mold;

In horizontal cross-section, the mounting face of the shell has an arc shape;

With each mounting face having, in horizontal cross-section, a semi-circular shape centered on the central axis of the passage opening;

The mounting face is concentric to the assembly face of the associated half-mold;

The molding unit comprises two boxing pistons that are each mounted to slide in an associated half-mold between a retracted position in relation to the molding cavity and an extended position in the molding cavity, with the boxing pistons being arranged in the thickness of each half-mold close to the hinge axis.

The invention also relates to a forming system comprising:

A rotary main wheel;

A number of molding units that are produced according to teachings of the invention, with the molding units being distributed uniformly on the periphery of the main wheel;

Forming devices comprising an end fitting for connection with the passage opening that is centered on the axis of the passage opening.

BRIEF DESCRIPTION OF THE FIGURES

Other characteristics and advantages of the invention will emerge during the reading of the following detailed description for the understanding of which reference will be made to the accompanying drawings in which.

DETAILED DESCRIPTION OF THE FIGURES

Hereinafter, elements having an identical structure or similar functions will be referred to by the same references.

In the description and in the claims, an orthogonal reference that is associated with each half-mold and that has the following orientations will be adopted in a non-limiting manner:

Longitudinal "L" directed from back to front in the direction of the other half-mold in the joined position;

Transverse "T" directed from left to right;

Vertical "V" directed from bottom to top, with the vertical direction being independent of the direction of gravity.

Below, a longitudinal transverse plane will be referred to as being a "horizontal" plane.

Figure 4:
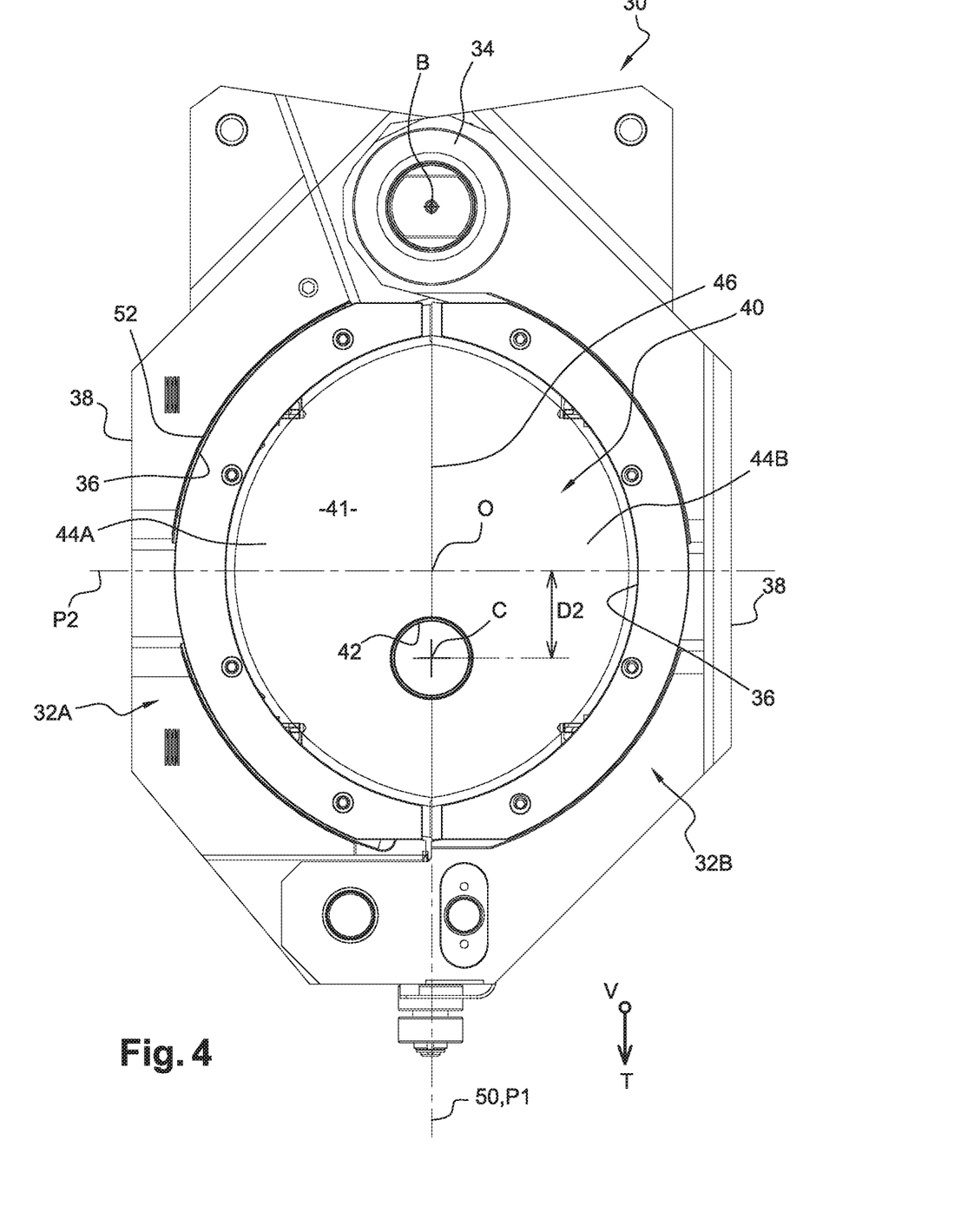
FIG. 4 is a top view that shows a molding unit that is produced according to a first embodiment of the invention, with the mold supports occupying a closed position and the half-molds a joined position.
Figure 5:
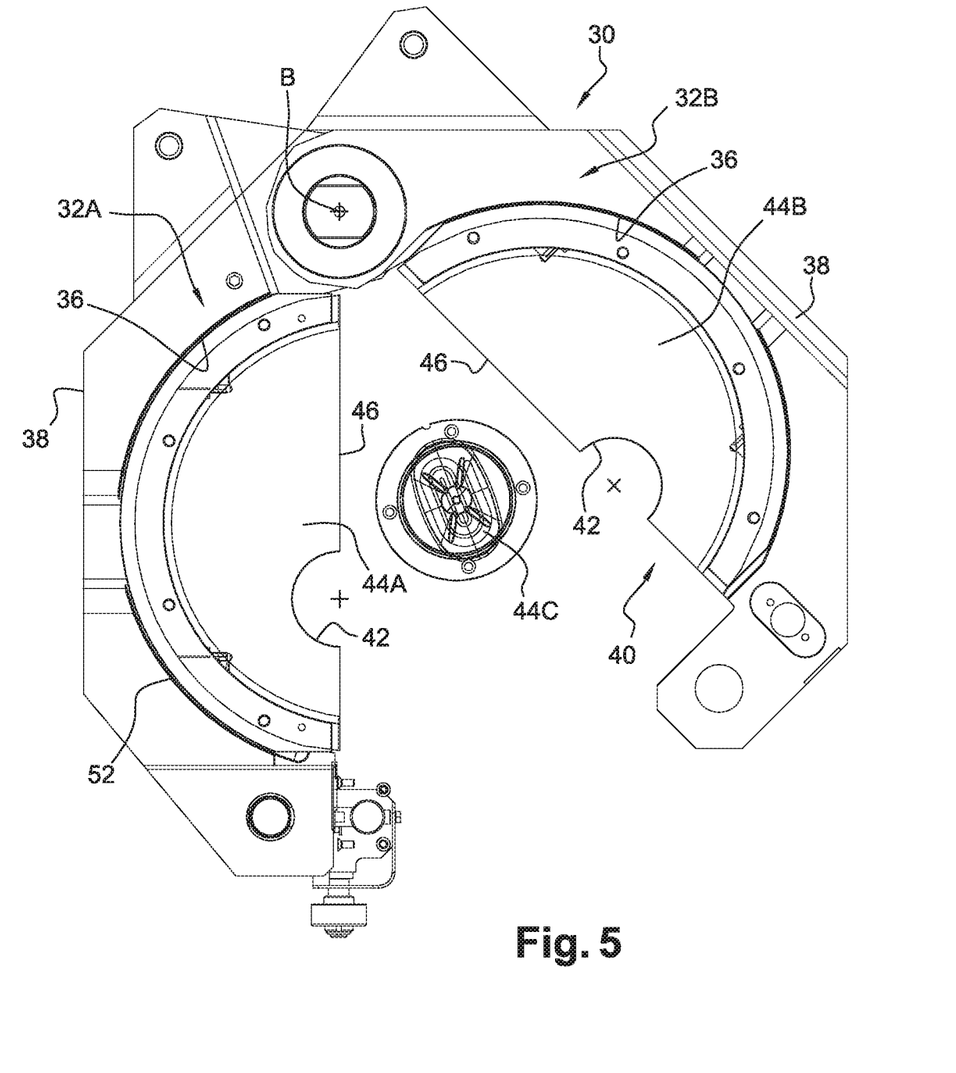
FIG. 5 is a view that is similar to that of FIG. 4, which shows the mold supports in the open position and the half-molds in the separated position.

Shown in FIGS. 4 and 5 is a molding unit 30 for the manufacturing of containers made of thermoplastic material, in particular of polyethylene terephthalate (PET) or polypropylene (PP), with an axis for vertical orientation by blow molding a preform (not shown).

The molding unit 30 comprises two mold supports 32A, 32B that are mounted to move between a closed position, shown in FIG. 4, and an open position, shown in FIG. 5. In the example that is illustrated in the figures, the two mold supports 32A, 32B are mounted to pivot in relation to one another around a vertical hinge 34 axis "B" that is arranged along a transverse end edge of the mold supports 32A, 32B. Such an arrangement is generally called "portfolio mold."

Although the invention is particularly advantageous with a portfolio mold, it is also applicable to mold supports that can move in translation in relation to one another.

Each mold support 32A, 32B is delimited longitudinally by a vertical front receiving face 36 and by a vertical rear face 38. The receiving face 36 of each mold support 32A, 32B is rotated toward the other mold support 32A, 32B when they occupy their closed position.

The molding unit 30 also comprises a mold 40 that has a molding cavity 48 that has the shape of the container that is to be obtained by blow molding. The cavity 48 is opening vertically upward in a flat horizontal upper face 41 of the mold 40 by a passage opening 42 that is designed to allow the neck 12 of the container that is to be obtained to pass. The passage opening 42 has a central vertical axis "C."

Figure 6:
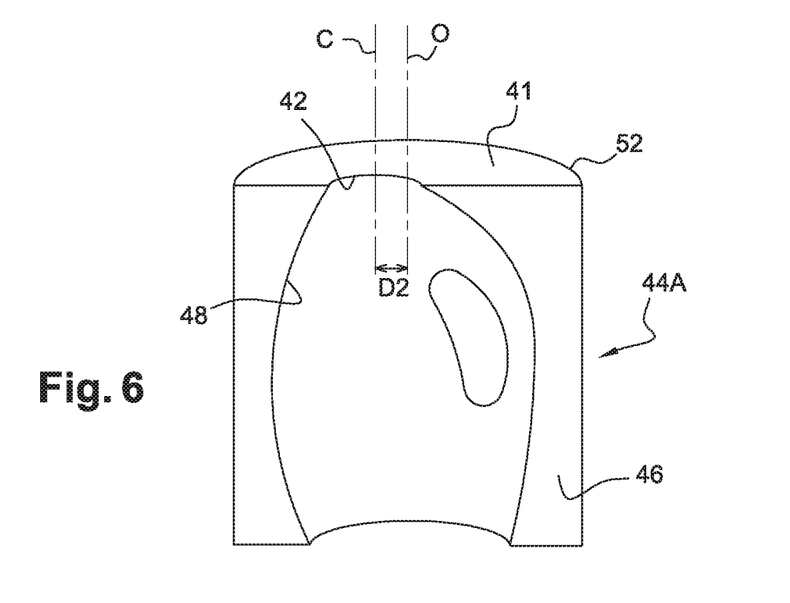
FIG. 6 is a perspective view that shows one of the half-molds that equips the molding unit of FIG. 4.

The mold 40 comprises at least one pair of complementary half-molds 44A, 44B. As is particularly visible in FIG. 6, each half-mold 44A, 44B has a transverse vertical front joint face 46 in which one half of the molding cavity 48 is formed. When the two half-molds 44A, 44B occupy a joined position, as illustrated in FIG. 4, the two half-molds 44A, 44B are flattened against one another by their respective joint face 46 so that their cavity halves recreate the molding cavity 48. The joint faces 46 then extend in a transverse vertical joint plane 50.

The passage opening 42 is arranged astride the joint plane 50, more particularly in such a way that the central axis "C" of the passage opening 42 is included in the joint plane 50.

In the embodiment that is shown in FIG. 5, the mold 40 comprises in addition a bottom 44C that is separate from the half-molds 44A, 44B. Thus, each half-mold 44A, 44B is able to form the body of the container, while the bottom 44C is able to form the bottom of the container.

As a variant, not shown, the mold comprises only two half-molds. The impression of each half-mold is then able to form the body and the bottom of the container.

By referring again to FIG. 4, each half-mold 44A, 44B also has a vertical rear assembly face 52 that is opposite to the joint face 46. The assembly face 52 has here a shape of a cylindrical sector that is less than 180° in such a way that the assembly faces 52 of the two joined half-molds 44A, 44B have, in horizontal cross-section, an oblong shape, here almond-shaped, elongated in a transverse direction. In other words, the assembly face 52 of each half-mold has an arc shape that is centered on a vertical reference axis (not shown) that is offset longitudinally toward the other half-mold 44B, 44A.

As a variant, the assembly faces of the two half-molds have, in horizontal cross-section, an elliptical shape or an oval shape, elongated in a transverse direction.

Each half-mold 44A, 44B is mounted in an associated mold support 32A, 32B by positioning its assembly face 52 against the associated receiving face 36 of the mold support 32A, 32B as shown in FIG. 4. For this purpose, the receiving face 36 has a shape that is complementary to that of the assembly face 52 of the associated half-mold 44A, 44B. Each half-mold 44A, 44B is assembled with its associated mold support 32A, 32B by any assembly means that is already known in the field of molding units with an interchangeable molding cavity 48.

The two half-molds 44A, 44B are able to occupy their joined position via their joint face 46 when the supports 32A, 32B occupy their closed position, as shown in FIG. 4, and a separate position in which the joint faces 46 are separated when the supports 32A, 32B occupy their open position, as shown in FIG. 5.

In the joined position, shown in FIG. 4, the assembly faces 52 of the two half-molds 44A, 44B have a first plane "P1" that extends along the joint faces 46. The first plane "P1" thus corresponds to the joint plane 50. The first plane "P1" passes via the center "C" of the passage opening 42. The first plane "P1" passes here in addition via the hinge axis "B." The first plane "P1" of symmetry corresponds here to a transverse vertical plane of symmetry.

In addition, still in a joined position, the assembly faces 52 of the two half-molds 44A, 44B have a second vertical plane "P2" of symmetry that is orthogonal to the first plane "P1" of symmetry. The two planes "P1" and "P2" of symmetry intersect at a central vertical axis "O" of the mold 40.

It will be noted that the central axis "O" of the mold 40 is not necessarily aligned with the central axis "A" of the container that is to be formed.

However, when the central axis "O" of the mold 40 is aligned with the central axis "A" of the container that is to be formed, this advantageously makes it possible to better distribute the material of the mold 40 in relation to the mold supports 32A, 32B.

Figure 7:
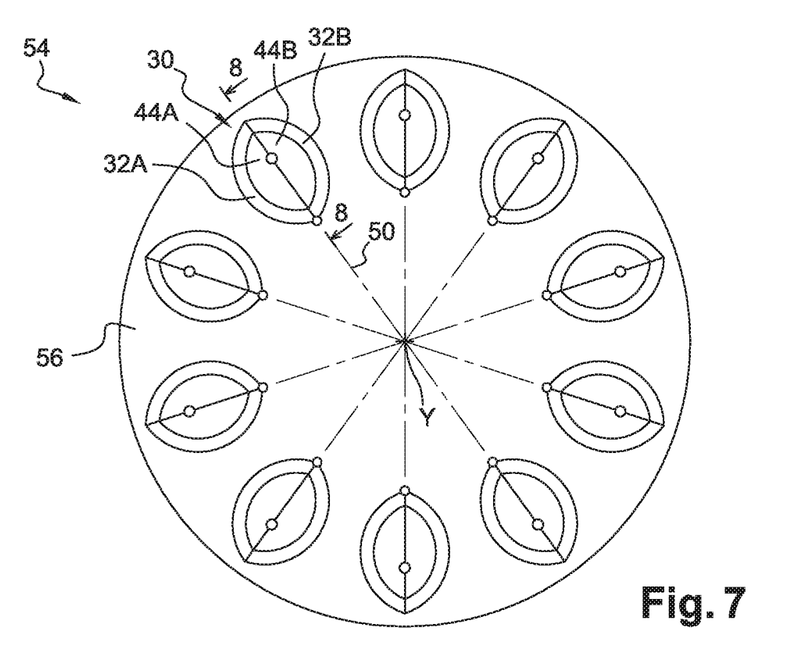
FIG. 7 is a top view that diagrammatically shows a forming system comprising a turning main wheel that is equipped with a number of molding units that are produced according to the first embodiment of the invention.

Shown in FIG. 7 is a system 54 for forming a thermoplastic container by forming, and in particular by blow molding or stretch blow molding, comprising a horizontal main wheel 56 that is mounted to rotate around a vertical central axis "Y" of rotation. The main wheel 56 comprises, on its periphery, a number of molding units 30, here 10 in number, each produced as has been described above. Each molding unit 30 is arranged in such a way that the joint plane 50 of its half-molds 44A, 44B, in the closed position of the mold supports 32A, 32B, passes through the axis "Y" of rotation of the main wheel 56. The hinge 34 is rotated toward the axis "Y" of rotation in such a way that the molds 44A, 44B open radially toward the outside of the main wheel 56.

Figure 8:
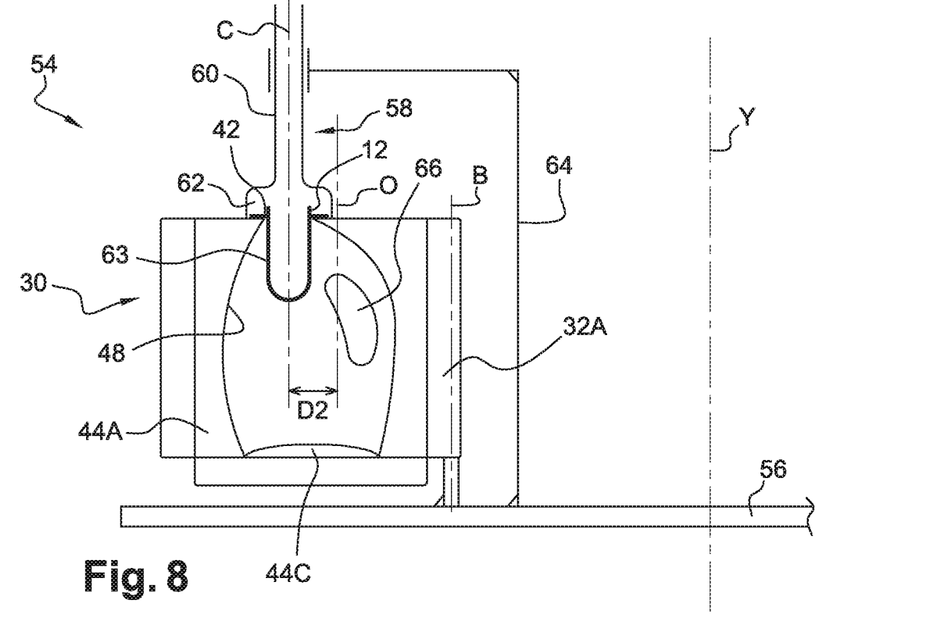
FIG. 8 is a vertical transverse cutaway view along the cutting plane 8-8 of FIG. 7 that shows a molding unit that is mounted on the main wheel of the forming system and that is equipped with a forming device.

As is shown in FIG. 8, each molding unit 30 is carried by the main wheel 56 in such a way that its hinge axis "B" is stationary in relation to said main wheel 56.

Furthermore, each molding unit 30 is associated with a blow-molding device 58 that is carried by the main wheel 56. The blow-molding device 58 comprises a blow-molding pipe 60 that is connected to a controlled source of pressurized forming fluid (not shown) and that empties into a connecting end fitting with the passage opening 42 that is centered on the axis "C" of the passage opening 42. The connecting end fitting here is a lower bell 62 that is centered on the axis "C" of the passage opening 42 of the mold 40 of the associated molding unit 30 when the mold 40 occupies its joined position. The bell 62 is mounted to slide vertically along the axis "C" on a support 64 that is mounted on the main wheel 56 between an active lower position in which the lower edges of the bell 62 are flattened against the upper face 41 of the mold 40 in a joined position for surrounding the passage opening 42 and a retracted upper position in which the bell 62 is separated from the upper face 41 to make possible the opening and closing of the mold supports 32A, 32B.

The active position of the bell 62 is, for example, shown in FIG. 8. The axis "C" for sliding of the bell 62 is stationary in relation to the main wheel 56. In its active position, the bell 62 is able to fill a hot preform 63 with pressurized forming fluid via its neck 12 in order to flatten its walls against the cavity 48 to form the body of the container.

According to the teachings of the invention, the central axis "C" of the passage opening 42 is offset transversely by a distance "D2" in relation to the central axis "O" of the mold 40. More particularly, the passage opening 42 is offset by a distance "D" in a direction that is opposite to that of the hinge axis "B" in such a way that the central axis "O" of the mold is interposed between the central axis "C" of the passage opening 42 and the hinge axis "B."

The offset of the axis "C" of the passage opening 42 in the direction of the peripheral edge of the main wheel 56 advantageously makes it possible to better use the volume encompassed between the mold supports 32A, 32B during the manufacturing of containers with an oblong cross-section. This makes it possible in particular to reduce the space requirement, in particular transverse, of the mold supports 32A, 32B in relation to a molding unit of the state of the art in which the passage opening is centered in relation to the mold.

Figure 10:
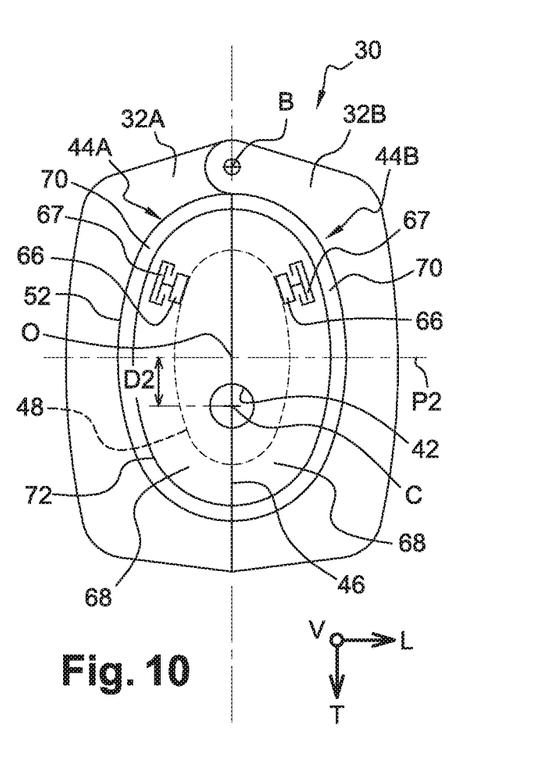
FIG. 10 is a view that is similar to that of FIG. 9 that shows the forming unit that is produced according to the second embodiment of the invention in another configuration.

Furthermore, to form the handle 14 of the container, the mold 40 is advantageously equipped with two boxing pistons 66 that are each mounted to slide in a work chamber 67 that is produced in an associated half-mold 44A, 44B between a retracted position in relation to the molding cavity 48 and an extended position in the molding cavity 48. The boxing pistons 66 are, for example, actuated by means of the controlled source of pressurized forming fluid. The boxing pistons 66 are arranged in the thickness of each half-mold 44A, 44B close to the hinge axis "B." The boxing pistons 66 are more particularly visible in the example that is shown in FIG. 10, in which the molding cavity 48 was shown in dashes.

The boxing pistons 66 are more particularly mounted overall opposite one another, in an essentially longitudinal sliding direction. Thus, during the forming of the container, when the container has undergone a blow-molding operation that flattened its wall against the cavity 48 and when the bell 62 occupies its active position, the pressure of the pressurized forming fluid is maintained inside the container. The boxing pistons 66 are then controlled from their retracted position to their extended position in order to push in the wall of the container against the pressure of the forming fluid in order to form the handle 14. The boxing pistons 66 are kept extended until the wall of the body of the container has acquired its definitive shape.

The offset of the passage opening 42 of the neck 12 to the peripheral edge of the main wheel 56 advantageously makes it possible to offset a portion of the cavity 48 transversely to the peripheral edge of the main wheel 56 in relation to a mold with a centered passage opening. This very advantageously makes it possible to release the space necessary to arrange boxing pistons 66 making it possible to obtain an adequate thrust force for greatly overstressing the pressure of the forming fluid contained in the container during its forming. The arrangement of such boxing pistons 66 in a molding unit 30 that is produced according to the teachings of the invention makes it possible in particular to obtain a mold 40 that is equipped with boxing pistons 66 while preserving a reduced, in particular transverse, space requirement.

Such a configuration thus makes it possible for this molding unit to be installed on a standard carousel by replacing a mold with a centered passage opening. With no offsetting of the axis of the opening, such a mold comprising boxing pistons should be installed on a carousel with a larger diameter than a standard carousel.

Here, each half-mold 44A, 44B is made of a single piece.

Figure 9:
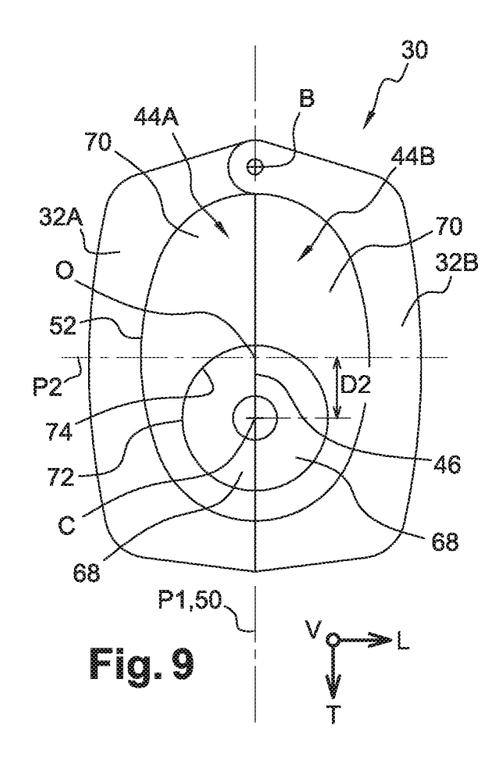
FIG. 9 is a top view that diagrammatically shows a forming unit that is produced according to a second embodiment of the invention.

According to a second embodiment of the invention that is shown in FIGS. 9 and 10, each half-mold 44A, 44B is made of two separate parts that are formed by a shell 68 and by a shell-carrier 70.

The internal shell 68 is delimited longitudinally by a front transverse vertical face forming the joint face 46 of the half-mold 44A and by a rear face, opposite to the joint face 46, forming a mounting face 72. In horizontal cross-section, the mounting face 72 has a convex shape.

The external shell-carrier 70 is delimited longitudinally by a front receiving face 74 with a shape that is complementary to that of the mounting face 72. The shell 68 is designed to be housed in the shell-carrier 70, its mounting face 72 being flattened against the receiving face 74 of the shell-carrier 70. The shell-carrier 70 is also delimited toward the rear by an opposite rear face that forms the assembly face 52 of the half-mold 44A.

Thus, the shell 68 carries half of the molding cavity 48. Generally, the shell-carrier 70 is equipped with cooling means (not shown) of the shell 68.

According to a first variant embodiment of the second embodiment that is shown in FIG. 9, the mounting face 72 has, in horizontal cross-section, the shape of a half-circle that is centered on the central axis "C" of the passage opening 42. This is the case of, for example, a mold 40 that is used to produce containers having a centered neck 12.

According to this first variant, so that the central axis "C" of the passage opening 42 is aligned with the sliding axis of the bell 62, the shell 68 is arranged transversely eccentric in relation to the assembly face 52 in the shell-carrier 70 as is shown in FIG. 9. Thus, the receiving face 74 of the shell-carrier 70 is offset transversely opposite the hinge axis "B" in relation to the second plane "P2" of symmetry of the assembly face 52 of the mold 40.

According to a second variant embodiment of the second embodiment that is shown in FIG. 10, the mounting face 72 is arranged in a manner that is concentric to the assembly face 52 of the mold 40.

The molding unit 30 that is produced according to any one of the embodiments that are described above advantageously makes it possible to produce the containers with eccentric necks while proposing a reduced space requirement in relation to the molding units of the state of the art.

The molding units that are produced according to the teachings of the invention also make it possible easily to produce the molds that are equipped with boxing pistons without it being necessary to increase the space requirement of the molding unit.

The molding units that are produced according to the teachings of the invention also make it possible easily to produce containers with centered necks by replacing the molds or simply the shell when each half-mold is made of two parts.

The invention claimed is:

1. Forming system (54), comprising a rotary main wheel (56) that is mounted to rotate around an axis (Y) of rotation and a plurality of molding units (30) with the molding units (30) being distributed uniformly on a periphery of the main wheel (56), each of the molding units (30) being structured for the forming of containers made of thermoplastic material starting from preforms (63), by blow molding or stretch blow molding, with the molding unit (30) comprising:
   Two mold supports (32A, 32B) that can move between an open position and a closed position, the two mold supports (32A, 32B) being mounted to pivot in relation to one another around a vertical hinge (34) axis (B), the hinge (34) being rotated toward the axis (Y) of rotation in such a way that the molds (44A, 44B) open radially toward an outside of the main wheel (56);
   A mold (40) comprising at least two half-molds (44A, 44B), each designed to be mounted on one of the associated mold supports (32A, 32B), each half-mold (44A, 44B) being delimited by a front joint face (46) and by a rear assembly face (52), with the two half-molds (44A, 44B) being able to occupy a joined position by their joint face (46) when the mold supports (32A, 32B) occupy their closed position;
   A molding cavity (48) that is made of two parts in each joint face (46) and that is recreated when the mold (40) occupies its joined position, where the cavity (48) opens vertically upward via a passage opening (42) that is designed to allow a neck (12) of the preform (63) to pass; In the joined position, the assembly faces (52) of the mold (40) have:
   A first transverse vertical plane (P1) that extends along joint faces (46) and that passes through the center (C) of the passage opening (42), and
   A second vertical plane (P2) of symmetry that is orthogonal to the first plane (P1) of symmetry, with the two planes (P1, P2) of symmetry intersecting at a central vertical axis (0) of the mold (40);
   wherein a central axis (C) of the passage opening (42) is offset transversely by a distance (D) in a direction that is opposite to that of the hinge axis (B) in such a way that the central axis (O) of the mold is interposed between the central axis (C) of the passage opening (42) and the hinge axis (B).

2. Forming system (54) according to claim 1, wherein the first plane (P1) passes via a hinge axis (B) between the two mold supports.

3. Forming system (54) according to claim 1, wherein in the joined position of the mold (40), the assembly faces (52) have an elliptical horizontal cross-section.

4. Forming system (54) according to claim 1, wherein in the joined position of the mold, the assembly face (52) of each half-mold (44A, 44B) has a horizontal arc-shaped cross-section that extends over a sector that is less than 180°.

5. Forming system (54) according to claim 1, wherein each half-mold (44A, 44B) is made of a single piece.

6. Forming system (54) according to claim 1, wherein each mounting face (72) has, in horizontal cross-section, a half-circle shape that is centered on the central axis (C) of the passage opening (42).

7. Forming system (54) according to claim 1, further comprising two boxing pistons (66) that are each mounted to slide in an associated half-mold (44A, 44B) between a position that is retracted in relation to the molding cavity (48) and an extended position in the molding cavity (48), with the boxing pistons (66) being arranged in the thickness of each half-mold (44A, 44B) close to the hinge axis (B).

8. Forming system (54), according to claim 1, comprising forming devices (58) comprising an end fitting for connection with the passage opening (42) that is centered on the axis (C) of the passage opening (42).

9. Forming system (54) according to claim 1, wherein in the joined position of the mold, the assembly faces have an elliptical horizontal cross-section.

10. Forming system (54) according to claim 1, wherein in the joined position of the mold, the assembly face of each half-mold has a horizontal arc-shaped cross-section that extends over a sector that is less than 180°.

11. Forming system (54) according to claim 2, wherein each half-mold is made of a single piece.

12. Forming system (54) according to claim 3, wherein each half-mold is made of a single piece.

13. Forming system (54) according to claim 4, wherein each half-mold is made of a single piece.

14. Forming system (54) according to claim 1, wherein each half-mold is made of two parts:
- An internal shell that is delimited longitudinally by a front face forming the joint face of the half-mold and by a rear face, opposite to the joint face and forming a mounting face of convex shape;
- An external shell-carrier that is delimited longitudinally by a front receiving face of a shape that is complementary to that of the mounting face of the shell and in which the mounting face of the shell is housed and by an opposite rear face that forms the assembly face of the half-mold.

15. Forming system (54) according to claim 3, wherein each half-mold is made of two parts:
- An internal shell that is delimited longitudinally by a front face forming the joint face of the half-mold and by a rear face, opposite to the joint face and forming a mounting face of convex shape;
- An external shell-carrier that is delimited longitudinally by a front receiving face of a shape that is complementary to that of the mounting face of the shell and in which the mounting face of the shell is housed and by an opposite rear face that forms the assembly face of the half-mold.

16. Forming system (54) according to claim 4, wherein each half-mold is made of two parts:
- An internal shell that is delimited longitudinally by a front face forming the joint face of the half-mold and by a rear face, opposite to the joint face and forming a mounting face of convex shape;
- An external shell-carrier that is delimited longitudinally by a front receiving face of a shape that is complementary to that of the mounting face of the shell and in which the mounting face of the shell is housed and by an opposite rear face that forms the assembly face of the half-mold.

17. Forming system (54) according to claim 2, further comprising two boxing pistons that are each mounted to slide in an associated half-mold between a position that is retracted in relation to the molding cavity and an extended position in the molding cavity, with the boxing pistons being arranged in the thickness of each half-mold close to the hinge axis.

18. Forming system (54), comprising a rotary main wheel (56) that is mounted to rotate around an axis (Y) of rotation and a plurality of molding units (30) with molding units (30) being distributed uniformly on a periphery of the main wheel (56), each of the molding units (30) being structured for the forming of containers made of thermoplastic material starting from preforms (63) by blow molding or stretch blow molding, with the molding unit (30) comprising:
- Two mold supports (32A, 32B) that can move between an open position and a closed position;
- A mold (40) comprising at least two half-molds (44A, 44B), each designed to be mounted on one of the associated mold supports (32A, 32B), each half-mold (44A, 44B) being delimited by a front joint face (46) and by a rear assembly face (52), with the two half-molds (44A, 44B) being able to occupy a joined position by their joint face (46) when the mold supports (32A, 32B) occupy their closed position;
- A molding cavity (48) that is made of two parts in each joint face (46) and that is recreated when the mold (40) occupies its joined position, where the cavity (48) opens vertically upward via a passage opening (42) that is designed to allow a neck (12) of the preform (63) to pass; In the joined position, the assembly faces (52) of the mold (40) have:
  - A first transverse vertical plane (P1) that extends along joint faces (46) and that passes through the center (C) of the passage opening (42), and
  - A second vertical plane (P2) of symmetry that is orthogonal to the first plane (P1) of symmetry, with the two planes (P1, P2) of symmetry intersecting at a central vertical axis (0) of the mold (40);
wherein each half-mold (44A, 44B) is made of two parts:
An internal shell (68) that is delimited longitudinally by a front face forming the joint face (46) of the half-mold (44A, 44B) and by a rear face, opposite to the joint face (46) and forming a mounting face (72) of convex shape;
An external shell-carrier (70) that is delimited longitudinally by a front receiving face (74) of a shape that is complementary to that of the mounting face (72) of the shell (68) and in which the mounting face (72) of the shell (68) is housed and by an opposite rear face that forms the assembly face (52) of the half-mold (44A, 44B);
wherein a central axis (C) of the passage opening (42) is offset transversely in relation to the central axis (0) of the mold (40), and
wherein each mounting face (72) has, in horizontal cross-section, a half-circle shape that is centered on the central axis (C) of the passage opening (42).

* * * * *